Dec. 14, 1948.  W. H. CHURCHILL  2,456,553

FASTENER CLIP

Filed June 14, 1944

Inventor

Wilmer H. Churchill.

By Walter S. Jones

Attorney

Patented Dec. 14, 1948

2,456,553

UNITED STATES PATENT OFFICE 2,456,553

FASTENER CLIP

Wilmer H. Churchill, Saugus, Mass., assignor to United-Carr Fastener Corporation, Cambridge, Mass., a corporation of Massachusetts Application June 14, 1944, Serial No. 540,305

5 Claims. (Cl. 24—81)

The present invention relates to fastener clips and more particularly to fastener clips designed to be slipped upon adjoining faces of an angle supporting member and securely gripped thereon and provided with means to slidably receive and retain a part to be supported by the support.

More particularly, the invention provides an improved and simplified fastener clip for removably attaching cable harness clamps to an angular structural member or support.

Other aims and advantages of the invention will be apparent from a consideration of the accompanying drawing and annexed specification illustrating and describing a preferred form of the invention.

Figure 1:
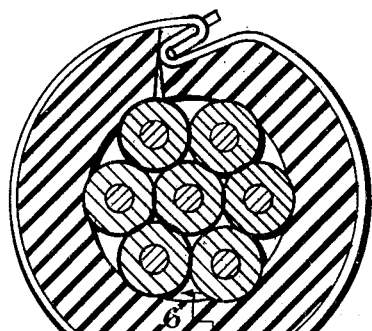
Fig. 1 is a side elevation of a cable harness clamp installation employing my improved fastener clip, a portion of the mount for the clamp being shown broken away.
Figure 2:
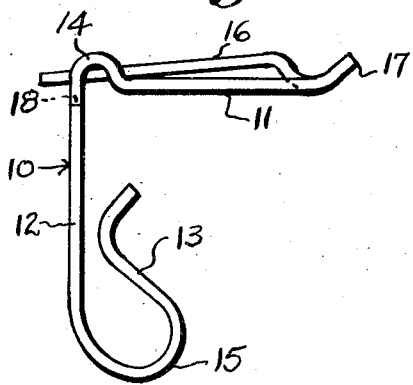
Fig. 2 is a side elevation of the clip of the present invention.

Referring to the drawings, my improved fastener clip is advantageously formed of a single piece of resilient material, such as spring sheet metal, and comprises a substantially L-shaped member 10 having a base portion 11 and an angularly disposed clamping or attaching portion 12 for clamping engagement with a support. The clip is designed primarily for attachment to an angle structural member 1 or support which may be an ordinary angle bar, or the like. In certain structures, for example, aircraft, railway cars and the like, structural members of angle shape are employed and it is desirable to use these as supports for cable harness clamps where such are employed. In many instances these angle structural members 1 have inwardly flanged free edges 2 and the bars may be rolled sections of steel, aluminum or other metal.

Regardless of the shape of the supporting member 1, it is usually disposed so that one web 3 is horizontal and joins an angular depending flange 4. My improved fastener clip is constructed so that the base 11 thereof engages and is supported by the horizontal web 3 while the clamping portions engage opposite faces of the flange to securely attach the clip to the support.

In the preferred embodiment of the invention, the fastener clip comprises a base portion 11 designed to engage and be supported by the web 3 of the support and angularly disposed clamping portions 12—13 adapted to engage opposite faces of the flange 4. The clamping portion 12 is connected to the base portion 11 by a U-shaped resilient hinge portion 14 and the clamping portions 12—13 are connected by a bight portion 15. The portion 13 extends from the bight portion 15 in convergent relation with the portion 12 toward the free end of the portion 13 so as to provide yielding clamping engagement with the opposed faces of the flange 4 of the support.

Figure 5:
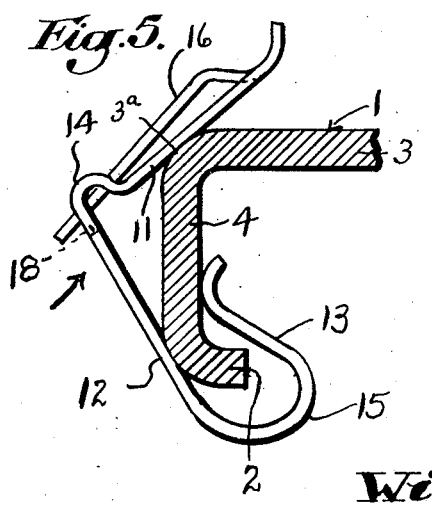
Fig. 5 is a view illustrating the manner of applying the fastener clip to the support.
Figure 4:
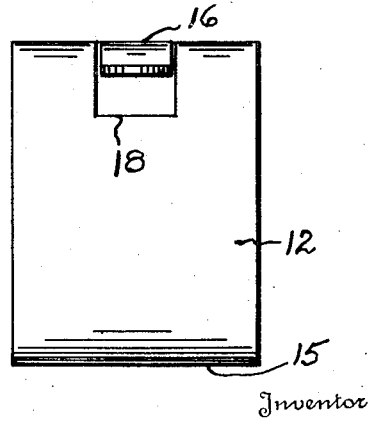
Fig. 4 is a front elevation thereof.

The fastener clip 10 is applied to the support 1 by first forcing the tensioned clamping portions 12—13 over the end 2 of the support flange 4, the clamping portion 12 and the base 11 being angularly disposed with relation to the flange 4 and web 3 respectively, of the support, as illustrated in Fig. 5. Then by applying pressure to the upper portion of the clamping portion 12, for example, as in the direction of the arrow (Fig. 5), the base 11 is forced across the corner 3ª of the support, the outward yielding thereof being permitted by the resilient hinge 14. As the base 11 is forced over the corner of the support, it finally snaps into engagement with the surfaces of the web 3, as shown in Fig. 1, and is securely held in this position by the tension of the portions 11—12 as well as by the fact that clamping portions 12—13 tensionally grip opposite faces of the flange 4.

Figure 3:
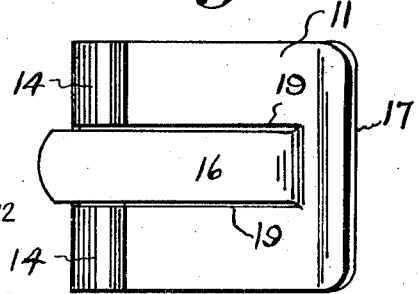
Fig. 3 is a top plan view thereof.
Figure 6:
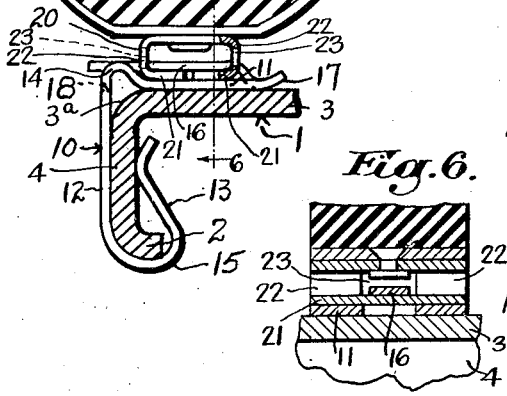
Fig. 6 is a cross sectional view of the mount of the cable harness clamp and a portion of the clip.

The upper surface of the base portion 1 of the fastener clip advantageously provides an article-supporting surface. To retain the article to be supported securely on said base portion the latter is formed with a tongue 16 cut from the body of the base 11 and integrally joined thereto adjacent but rearwardly of the forward terminal end 17 thereof. Preferably the tongue 16 is of substantially less width than the base 11, as shown in Fig. 3, so as to provide an upper clamping surface of substantial width, while the base 11 provides lower supporting and clamping surfaces on opposite sides of the tongue. The tongue 16 may be formed by slitting the base from a cut 18 in the upper part of the clamping portion 12 extending through the hinge 14 and along spaced lines 19 toward the end 17 and then displacing the body portion of the tongue outwardly from the plane of the base.

Preferably the tongue 16 and the connected end are displaced outwardly from the plane of the base 11, a distance substantially equal to the thickness of the part to be supported by the fastener clip and the tongue may extend rearwardly in convergent relation toward the base with a portion adjacent the terminal end disposed within the cut-out 18.

The improved fastener clip of the invention is highly useful for removably attaching cable harness clamps to supports of angle sections, such cable harness clamps advantageously being of the type disclosed in my United States Patent No. 2,327,326, granted August 17, 1943.

These clamps or like devices may comprise a mounting or part 20 (Fig. 1) having leg portions 22 defining a slotted aperture 23 and connecting a sheet metal base portion 21, so adapted that the base portion 21 may be slipped under the tongue 16 which will pass through the slotted aperture 23 and upon the base portion 11 where it is held frictionally by the tensioned tongue. Accidental removal of the part 21 from the clip is prevented by the outwardly projecting hinge portion 14 which extends beyond the surface of the base portion 11.

The fastener clip of the present invention is extremely simple in construction, economical of manufacture and may be quickly applied to an angle support.

Although I have illustrated and described one specific embodiment of the invention, I do not wish to be limited thereby because the scope of the invention is best defined by the following claims.

I claim:

1. A fastener clip for attachment to a support having angularly disposed web and leg portions, said clip comprising an article-supporting base and an angularly disposed attaching portion, said attaching portion having opposed resilient clamping portions for anchoring the attaching portion to the leg portion of the support, and a resilient hinge connecting the attaching and base portions permitting the latter to be sprung over a corner of the support and snapped into engagement with the web thereof and an article-engaging tongue extending from said base from a point adjacent the free end thereof rearwardly beyond the resilient hinge.

2. A fastener clip for attachment to a support having angularly disposed web and leg portions, said clip comprising an article-supporting base and a loop-shaped attaching portion extending in angular relation thereto, and a resilient hinge connecting the attaching portion and the base, said loop portion having opposed clamping portions cooperating to engage opposed surfaces of said leg portion whereby said clip is secured to said support.

3. A fastener clip for attachment to a support having angularly disposed web and leg portions, said clip comprising an article-supporting base and a loop-shaped attaching portion extending in angular relation thereto, and a resilient hinge connecting the attaching and base portions permitting the latter to be sprung over a corner of the support and snapped into engagement with the web thereof, said loop portion having opposed clamping portions cooperating to engage opposed surfaces of said leg portion.

4. A fastener clip for attachment to a support having angularly disposed web and leg portions, said clip comprising an article-supporting base and a loop-shaped attaching portion extending in angular relation thereto, and a resilient hinge connecting the attaching and base portions permitting the latter to be sprung over a corner of the support and snapped into engagement with the web thereof, said loop portion having opposed resilient clamping portions connected by a bight at one end of said loop portion, said clamping portions cooperating to engage opposed surfaces of said leg portion, and said clamping portion being normally disposed in predetermined non-symmetrical relation one to another whereby one clamping portion has a shape approximating the contour of a portion of one surface of said leg when said clip is secured to said support.

5. A fastener clip for attachment to a support having angularly disposed web and leg portions, said clip comprising an article-supporting base and a loop-shaped attaching portion extending in angular relation thereto, and a resilent hinge connecting the attaching and base portions permitting the latter to be sprung over a corner of the support and snapped into engagement with the web thereof, said loop portion having opposed resilient clamping portions for engagement with opposed surfaces of the leg portion of said support, and one of said elements having a radius of predetermined size approximating a radius provided by a surface of said leg thereby to increase the bearing engagement between said clamping portions and said leg.

WILMER H. CHURCHILL.

REFERENCES CITED

The following references are of record in the file of this patent:

UNITED STATES PATENTS

| Number | Name | Date |
|---|---|---|
| 1,521,481 | Spencer | Dec. 30, 1924 |
| 2,127,234 | Reiter | Aug. 16, 1938 |
| 2,327,326 | Churchill | Aug. 17, 1943 |
| 2,329,894 | Hall | Sept. 21, 1943 |
| 2,332,855 | Jones | Oct. 26, 1943 |
| 2,339,845 | Duwe | Jan. 25, 1944 |